2,940,971

TETRAHYDROOXAZINONES

William A. Lott, Maplewood, N.J., assignor to Olin Mathieson Chemical Corporation, New York, N.Y., a corporation of Virginia No Drawing. Filed Dec. 16, 1957, Ser. No. 702,772

5 Claims. (Cl. 260—244)

This invention relates to new chemical compounds and more particularly to new tetrahydrooxazinones of the general formula

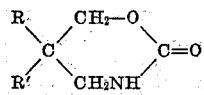

wherein R and R' are organic radicals of less than ten carbon atoms selected from the group consisting of lower alkyl, aryl and aralkyl, and which may be the same or different.

The 5,5-di-substituted-tetrahydro-2H,1,3-oxazin-2-ones of this invention can be prepared by the process of this invention which comprises reacting a 2,2-disubstituted-aminopropanol of the general formula:

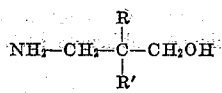

wherein R and R' are as above-defined, with phosgene, the reaction preferably being conducted in the cold (i.e. a temperature below ambient temperature) in an organic solvent or mixture of solvents for the reactants. The aminopropanol reactant can in turn be formed by reducing the corresponding disubstituted-cyanoacetate derivative of the general formula:

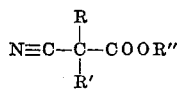

wherein R and R' are as above-defined, and R'' is the residue of any esterifying alcohol, such as a lower alkyl radical, as by treatment with lithium aluminum hydride at an elevated temperature.

The compounds of this invention are physiologically active substances having central nervous system activity. Thus, tetrahydro-5-methyl-5-propyl-2H-1,3-oxazin-2-one can be used in lieu of known central nervous system stimulants, such as amphetamine, nikethamide, and megamide, in the treatment of barbituric acid poisoning, inter alia. For such purpose the compounds of this invention are administered intervenously or perorally with dosage adjusted for the particular activity of a given compound.

The following examples illustrate the invention:

EXAMPLE 1

*Tetrahydro-5-methyl-5-propyl-2H-1,3-oxazin-2-one*

A solution of 85 g. ethyl methyl-n-propyl cyanoacetate in 500 ml. anhydrous ether is added dropwise with stirring to a suspension of 50 g. lithium aluminum hydride in 1800 ml. of anhydrous ether. After refluxing for eight hours the reaction mixture is cooled and the excess lithium aluminum hydride is decomposed by the cautious addition of 80 ml. of water followed by a solution of 14.5 g. sodium hydroxide in 270 ml. of water. The ethereal solution is decanted from the mixture, dried and distilled to give about 42 g. of 2-(aminomethyl)-2-methyl-1-pentanol, B.P. 73–77° C. at 1 mm., $n_d^{24}$ 1.4610. A solution of this material and 122 g. of antipyrine in 200 ml. of anhydrous chloroform is added at 0° to 5° with stirring to a solution of 31.3 g. of phosgene in 260 ml. of anhydrous toluene. After standing over-night the reaction mixture is diluted with 400 ml. anhydrous ether and filtered to remove the antipyrine hydrochloride. The ether is removed and the residue fractionated under reduced pressure to give about 23 g. of tetrahydro-5-methyl-5-propyl-2H-1,3-oxazin-2-one, B.P. about 136–137° C. at 0.3 mm., $n_d^{21}$ 1.4795. Upon cooling, the material solidified to a white waxy solid which melted at about 35–37° C.

EXAMPLE 2

*Tetrahydro-5-ethyl-5-(1-methylpropyl)-2H-1,3-oxazine-2-one*

(a) *Ethyl ethyl-S-butylcyanoacetate.*—A solution of 102 g. ethyl-S-butyl cyanoacetate is added at a reaction temperature of 35° C. to a solution of 13.8 g. of metallic sodium in 300 ml. absolute alcohol. The reaction mixture is then treated dropwise with 109 g. ethyl iodide over a period of 45 minutes. After the addition, the reaction mixture is stirred for two hours at room temperature and for eight hours at 80° C., after which time the mixture is neutral. The alcohol is distilled off. The reaction mixture is cooled, diluted with water and the solution extracted with 2 x 200 ml. ether. The ethereal layer is dried and, after distilling off the ether, the residue is fractionated to give about 85 g. of ethyl ethyl-S-butylcyanoacetate, B.P. about 75–78° C./1 mm., $n_d^{25}$ 1.4323.

(b) *3-amino-2-ethyl-2-S-butylpropanol-1.*—A solution of 85 g. ethyl ethyl-S-butyl cyanocetate in 300 ml. anhydrous ether is added dropwise to a suspension of 40 g. lithium aluminum hydride in 1500 ml. anhydrous ether at a rate which maintains gentle refluxing. After the addition, the reaction mixture is refluxed for eight hours, cooled and decomposed by the cautious addition of a cold solution of 12 g. sodium hydroxide in 100 ml. water. After stirring for one hour, the solid is allowed to settle and the ethereal solution is decanted, washed with 200 ml. of water and dried. The ether is removed and the residue is fractionated to give about 60 g. of material, B.P. about 83° C. at 0.5 mm.

(c) *5 - ethyltetrahydro - 5 - (1-methylpropyl)-2H-1,3-oxazin-2-one.*—A solution of 24 g. of 3-amino-2-ethyl-2-S-butyl propanol-1 and 61 g. of antipyrine in 100 ml. of chloroform is added dropwise at a temperature of 5–10° C. with stirring to a solution of 61 g. of phosgene in 135 mg. of anhydrous toluene. Stirring is continued for eight hours at 25°. After adding 600 ml. of anhydrous ether, the reaction mixture is filtered to remove antipyrine hydrochloride. The ether layer is separated, washed with water and dried. After distilling off the ether, the residue is fractionated to give 15 g. of material which distilled at about 162° C. ($n_D^{25}$ 1.4883) as a light yellow oil.

Similarly, by substituting other disubstituted cyanoacetates for the ethyl ethyl-S-butyl-cyanoacetate in step b of Example 2, the corresponding 5,5-disubstituted tetrahydrooxazinones are formed. Thus, ethyl ethyl-n-butyl cyanoacetate, ethyl ethyl-1-methylbutyl cyanoacetate and ethyl benzyl-isopropyl cyanoacetate yield tetrahydro-5-ethyl-5-n-butyl-2H-1,3-oxazin-2-one, tetrahydro-5-ethyl-5-(1'-methylbutyl)-2H-1,3-oxazine-2-one, and tetrahydro-5-benzyl-5-isopropyl-2H-1,3-oxazin-2-one, respectively.

EXAMPLE 3

*Tetrahydro-5-ethyl-5-phenyl-2H-1,3-oxazin-2-one*

(a) *2-(aminomethyl)-2-phenyl-butanol-1.*—A solution of 86 g. (0.4 mole) of ethyl ethyl-phenyl cyanoacetate

[Chamberland et al., J.A.C.S. 57, 352 (1935)] in 200 ml. of anhydrous ether is added to a slurry of 40 g. (1.1 moles) of lithium aluminum hydride in 1800 ml. of anhydrous ether at a rate which maintains gentle reflux temperature. Following the addition, reflux temperature with stirring is maintained for eight hours. The reaction mixture is then cooled and 80 ml. of water is added dropwise followed by the addition of a solution of 24 g. of sodium hydroxide in 120 ml. of water. The ethereal solution is decanted from the resulting precipitate which is washed with ether and the combined ether solutions are dried over magnesium sulfate. After filtration, the solvent is removed by distillation leaving a residue of crude product weighing about 68 g. (94% of theory), which is purified by fractionation under reduced pressure to give a yield of about 25 g. of 2-(aminomethyl)-2-phenyl-butanol 1, B.P. about 93–95° C. at 0.1 mm. pressure.

(b) *Tetrahydro-5-ethyl-5-phenyl-2H-1,3-oxazin-2-one.*—A solution of 10.7 g. (0.06 mole) of 2-aminomethyl)-2-phenylbutanol-1 and 12.1 g. (0.12 mole) of freshly distilled triethylamine in 100 ml. of anhydrous ether is added with stirring over a period of 30 minutes at a reaction temperature of 0–5° C. to a solution of 6.0 g. (0.06 mole) of phosgene in 60 ml. of anhydrous ether. After the addition, stirring is continued as the reaction temperature attains room temperature. Following an additional stirring for four hours at a reaction temperature fo 35° C., the reaction mixture is filtered to remove 16 g. of triethylamine hydrochloride. The filtrate is washed three times with 25 ml. portions of water, dried over magnesium sulfate, filtered, and the solvent removed by distillation leaving a residue of tetrahydro-5-ethyl-5-phenyl-2H-1,3-oxazin-2-one weighing about 12 g. (theory 12.3 g.).

The invention may be variously otherwise embodied within the scope of the appended claims.

What is claimed is:

1. A process for preparing a compound of the general formula:

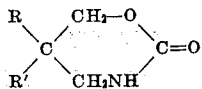

wherein R and R' are each organic radicals selected from the group consisting of lower alkyl, phenyl and benzyl which comprises interacting a compound of the general formula:

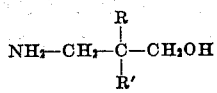

R and R' being as defined above, with phosgene and recovering the resultant product.

2. The process of claim 1 wherein the aminopropanol reactant is 2,2-di(lower alkyl)-3-aminopropanol-1.

3. The process of claim 1 wherein the aminopropanol reactant is 2-methyl-2-propyl-3-aminopropanol-1.

4. The process of claim 1 wherein the aminopropanol reactant is 2-ethyl-2-S-butyl-3-aminopropanol-1.

5. The process of claim 1 wherein the aminopropanol reactant is 2-(aminomethyl)-2-phenyl-butanol-1.

References Cited in the file of this patent

UNITED STATES PATENTS 2,701,246    Drechsel _____ Feb. 1, 1955

OTHER REFERENCES

Gaylord: Reduction with Complex Metal Hydrides, p. 733 (1956), Interscience Publishers Inc., New York.